United States Patent
Billington et al.

(10) Patent No.: US 6,588,907 B1
(45) Date of Patent: Jul. 8, 2003

(54) SELF-CONTAINED COOL-DOWN SYSTEM FOR A VIDEO PROJECTOR

(75) Inventors: Corey Billington, San Jose, CA (US); Chris Bradley, Redwood City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/228,322

(22) Filed: Aug. 26, 2002

(51) Int. Cl.⁷ .............................................. G03B 21/18
(52) U.S. Cl. ......................... 353/57; 353/52; 352/202; 348/748
(58) Field of Search ..................... 352/202; 362/294; 353/52, 57; 348/748; 359/512

(56) References Cited

U.S. PATENT DOCUMENTS

| | | | | | |
|---|---|---|---|---|---|
| 5,253,000 A | * | 10/1993 | Stoeckner | ..................... | 353/46 |
| 5,287,132 A | * | 2/1994 | Suzuki et al. | ................ | 353/119 |
| 5,353,075 A | * | 10/1994 | Conner et al. | .............. | 353/122 |
| 5,528,297 A | * | 6/1996 | Seegert et al. | ........... | 348/333.1 |
| RE36,060 E | * | 1/1999 | Miyashita | .................... | 348/748 |
| 6,467,910 B1 | * | 10/2002 | Sato | ............................. | 353/84 |

* cited by examiner

*Primary Examiner*—Russell Adams
*Assistant Examiner*—Michael Dalakis

(57) ABSTRACT

A cool-down system for portable projectors including a battery configured to power a cooling fan, if power to the cooling fan is cut off before the device has cooled down sufficiently to prevent degradation of one or more components.

11 Claims, 2 Drawing Sheets

SELF-CONTAINED COOL-DOWN SYSTEM FOR A VIDEO PROJECTOR

BACKGROUND OF THE INVENTION

1. Field of the Invention

The invention relates generally to digital/video projectors of the type connectable to a computer, usually a laptop, and are used in making presentations where slides are stored on a computer, such as with Microsoft PowerPoint presentations. More specifically, the invention relates to a system for enabling better cool-down of the light source and electronic componentry in such a projector to enable longer service life.

2. Related Art

It is well known that projectors, and particularly projector lamps, become very hot in operation, due to the heat generated by the lamps during operation. Moreover, where the light output is being directed through a printed circuit board with a digital light processor or liquid crystal display for projection, this electronic componentry can become hot as well because the intense light source placed proximate thereto. It has long been known that longer life in such devices can be achieved by providing for improved controlled cool-down after operation, and that such cool-down time can be enhanced by running a cooling fan after the light source has been switched off. Otherwise, when the cooling fan is turned off simultaneously with the light source, residual heat is not quickly dissipated and the temperature can briefly rise to a level that can damage the lamp and shorten its useful service life compared to properly using the cooling fan until the lamp is sufficiently cooled. This can also shorten the service life of the electronic componentry for essentially the same reasons.

Recognizing this fact, projection equipment has been configured to operate the cooling fan after the light source is turned off until the lamp is sufficiently cool. This cool-down has typically been done by providing a cool-down power switch setting manually selected by an operator, which turns on the fan while the light is off. This cool-down function has also been implemented by providing a timer or thermostat and configuring the projector to run the cooling fan automatically for a period of time after turning off the light source. In the latter case the timer or the thermostat provides a cut off signal when the device is below a temperature threshold in the case of the thermostat, or the fan has run long enough to provide the requisite cooling as predetermined and preprogrammed in a control system in the case of the timer.

However, in the case of digital/video projectors used in presentations at meetings, it is often the case that the projector is unplugged to allow the next presenter to use a power outlet for similar equipment. As such, if the cool-down functionality is provided for, the operator often voluntarily or involuntarily overrides the cool-down step in favor of disconnecting the projector from power and moving it or packing it away without allowing for the recommended or desired cool-down time. Often, users are simply in a hurry after using the projector and they unplug the device, or simply turn it off and leave the room, etc. and do not allow the cool-down for this reason of perceived need for haste at the expense of the cool-down of the device. As a consequence typical bulb service life, which would be expected to be about 2000 hours if the cool-down procedures recommended by the projector manufacturer were followed, can be reduced to approximately half that expected, or about 1000 hours, further depending on other factors such as rough handling, vibration, etc, to which the device is exposed. Moreover, the service life of the other electronic componentry may be shortened also due to extreme overheating when the cool-down step is not performed.

Accordingly, there is a need for a system and method of ensuring that a projection lamp and other electronic componentry utilized in a projection system have sufficient time to cool down properly regardless of whether the projection system is plugged in or turned off.

SUMMARY OF THE INVENTION

It has been recognized that it would be beneficial to provide for a post light source shut off cool down period where the cooling fan runs even if the device is unplugged after shutting it off. Accordingly, a projector is disclosed that comprises a light source cooling fan and power supply, and further includes a portable power supply, such as a battery or solar cell power source, such that the projector is configured to run the cooling fan from the portable power supply automatically for a sufficient time enough after shutoff to cool down the light source, regardless of the actions of the operator.

DETAILED DESCRIPTION

Figure 1:
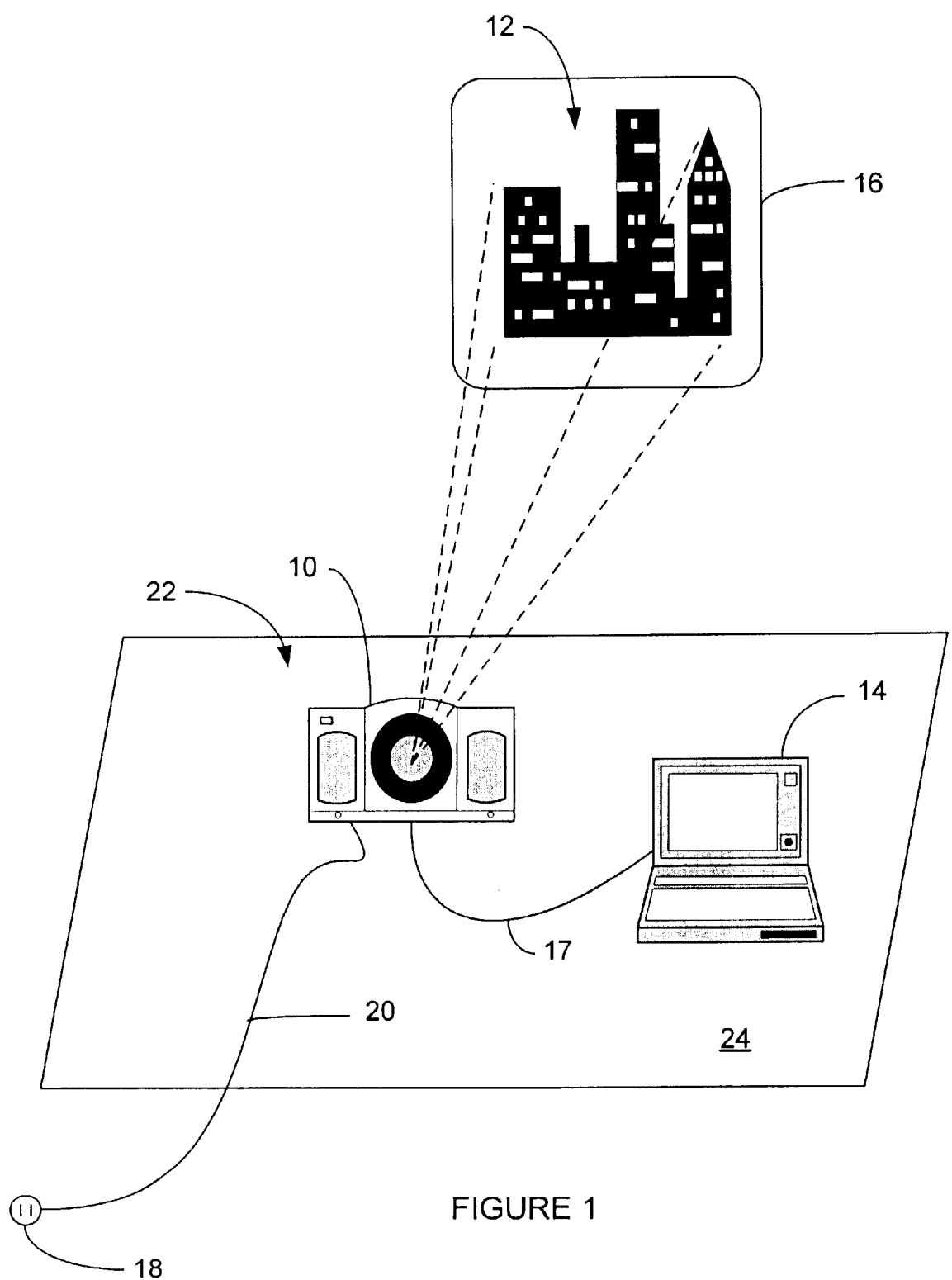
FIG. 1. is a perspective view of a projector in one embodiment.

With reference to FIG. 1 of the drawings, which are provided by way of example, and not by way of limitation, a projector 10 in accordance with principles of the invention is configured to project the screen display 12 of a laptop computer 14 onto a screen or wall 16 in connection with a presentation. The display data is transferred via a connector cable 17. The projector is connected to a wall socket power socket via outlet plug 18, which electrically couples to projector 10 by cord 20.

At the close of the presentation, projector 10 is often not allowed a sufficient cool-down period during which the cooling fan is running with the projector light source or lamp (not shown) turned off. For example, the projector may need to be removed from the area 22 on a support surface 24 in favor of another or different projector. In another scenario, the presenter may need to quickly pack up the equipment to go to another appointment, meet a plane, or the presenter may simply not be aware that the lamp is not sufficiently cool for transport. In any case, lack of sufficient cool-down time results in reduced service life of the bulb or the electronic componentry, or both.

Figure 2:
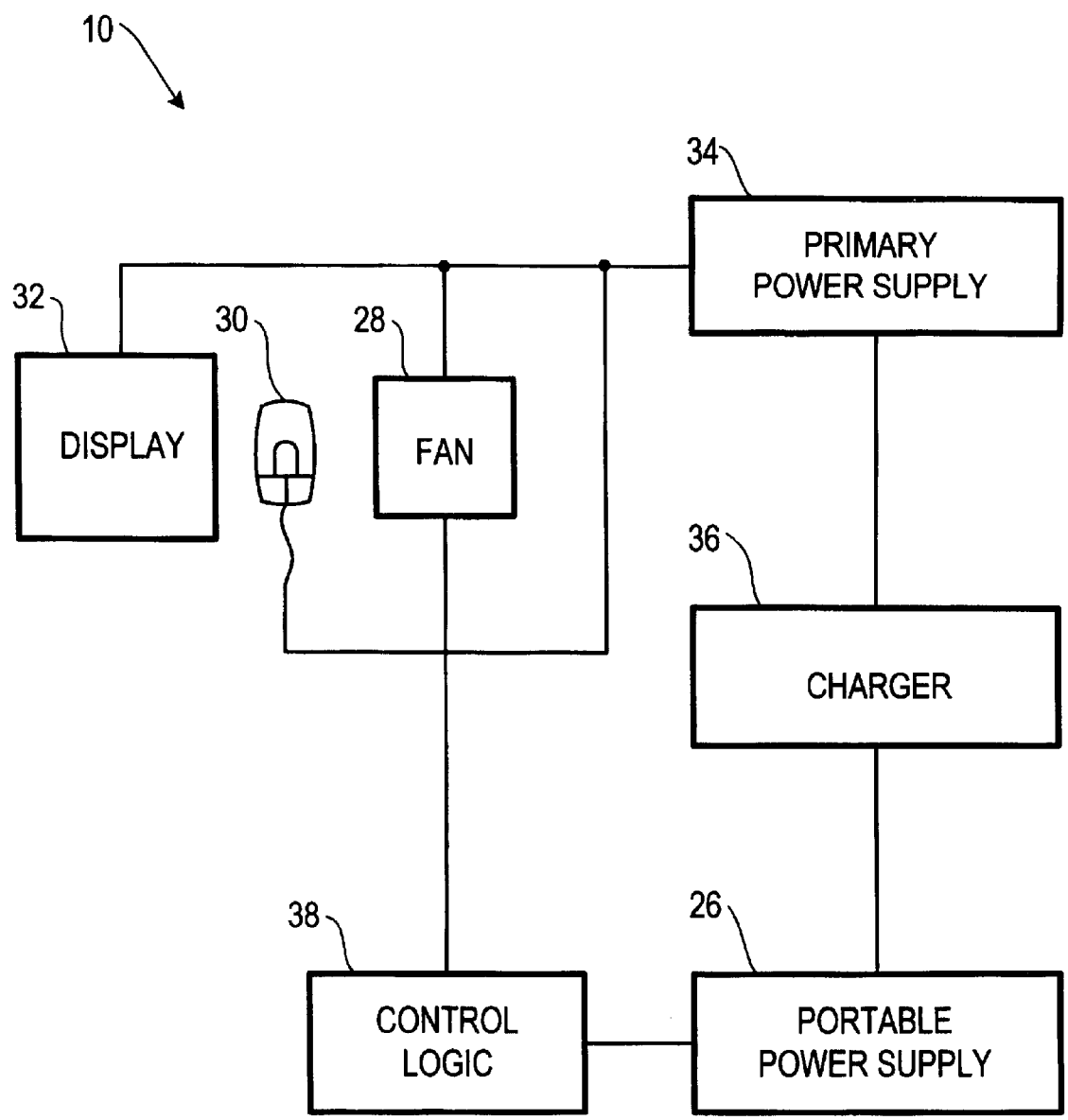
FIG. 2. is a schematic diagram illustrating one exemplary embodiment of the invention.

To mitigate the cool-down problem and as shown in FIG. 2, a portable power supply 26 is utilized to provide back up power to the fan to cool the lamp in the event the main power supply is disconnected. In the present embodiment, portable power supply 26 comprises a rechargeable battery, such as a lithium-ion, nickel-cadmium, nickel-hydride, or another similar type standard rechargeable battery known to those skilled in the art. Alternatively, a solar-power cell may also be utilized as the portable power supply 26. Other portable power supplies are also contemplated and include such sources as lithium-ion polymer and fuel cells. Projector 10 further includes a fan 28 to cool a lamp or bulb 30. Bulb 30 supplies light for a projection display 32, which is utilized to display images on a screen or wall. A primary power supply 34 is also provided, which provides power to all the components within projector 10, including fan 28, bulb 30, display componentry 32, and for recharging the battery used as portable power supply 26. A charger 36, which couples to both the power supply 34 and portable power supply 26, controls the charge management of the battery, when used as the portable power supply, by evaluating the charge state of the battery when powered by power supply 34. Control logic 38 is also provided and performs various functions as programmed.

Thus, portable power supply 26 provides power to cooling fan 28 for a sufficient time after power from power supply 34 has been shut off to the lamp or bulb 30. The cooling fan 28, as powered by power supply 26, is able to cool bulb 30, projection display 32, and other elements within the projector so as to prevent a temperature spike after shutdown.

In this embodiment, the cool-down is always performed by power supply 26 when power supply 34 is disconnected. Power supply 26 automatically powers fan 28 when power supply 34 is disconnected. Charger 36 is connected to the battery, which in one embodiment serves as the portable power supply 26, and power supply 34 and is configured to charge the battery when the projector 10 is connected to outlet power. The battery is connected to the cooling fan 28, which operates until the battery is discharged. Discharging the battery during each cool down mitigates a tendency for the battery to develop a shallow recharging capability due to repeated recharging when the battery is not fully discharged. The battery is disconnected from cooling fan 28 only after the output voltage drops below a threshold value commensurate with a discharged state for the battery. Control logic 38 can be programmed to monitor the output voltage of the battery to provide charging upon system power up. The battery is recharged when the projector is reconnected to a wall socket, regardless of whether the projector is turned on. In this way the battery is charged sufficiently to cool down the projector after use.

As will be appreciated, briefly turning on the light immediately after the battery has completely discharged may result in the battery being drained such that it cannot power the fan to cool down the bulb. Should this happen, control logic 38 can provide a warning signal through an indicator light (not shown), displaying text on a LCD status display on the device, or generating an audible warning, to indicate that the projector should not be unplugged until the warning indicator clears thereby indicating that the cool down is complete or that the battery carries ample charge to complete the cool down process.

In another embodiment, the battery can include a reserve cell, which powers the fan to provide an abbreviated cool-down if the light is turned back on briefly and the battery has been discharged already. Again a warning light can also be provided.

In yet another embodiment, control logic 38 can be programmed where in such a case power to the light is gradually reduced so that the need for cool down is mitigated, at least somewhat, and an operator would be discouraged from unplugging the device until the light bulb dims out. It will be appreciated that this latter functionality can be provided to occur in every case to reduce the amount of cool down required; however, only a few seconds of dimming might be tolerated before an operator will lose patience and pull the plug and begin packing up the portable projector in any event. Therefore, this is not a complete solution without also providing a battery-powered cool-down after the "brown-out" dimming shut off. Furthermore, some bulbs may be compromised by dimming out and where the goal is to increase bulb life; a dimming feature will compromise projection image at least somewhat.

In another embodiment, rather than cooling until the battery is discharged, control logic 38 is programmed to time the cool down and perform a fan shut off after a predetermined time has elapsed. In this embodiment the charger can be configured not to recharge the battery until it is sufficiently discharged to prevent "charge memory" reduction of storage capacity in the battery by repeated shallow drawdown and charging cycles of the battery.

Another embodiment contemplates the use of a battery having a greater charge capacity to sustain fan operation during periods of repeated use. For example, repeatedly turning the projector on immediately after commencement of cooling down drains the battery so as to make it unable to cool down the projector after only one or two repetitions of such a scenario. With such a battery and control logic, a large number of cycles of cool down and periods of immediate brief operation (followed again by cool down) can be accommodated to make depletion of the battery from this cause unlikely.

In another embodiment the length of the cool-down period is determined by programming control logic 38 to perform temperature sensing. Control logic 38 would also include a switch that opens to cut off battery power when the temperature falls below a threshold temperature value or to start up should the threshold value be exceeded. A low-cost thermostat of conventional configuration can be used in one embodiment to provide for shut off of the power from the battery. Again variations are possible.

In one embodiment the battery is supplemental to the cool down cycle powered by the power supply, and the battery cuts in if the power to the fan is prematurely cut off, for example by pulling outlet plug 18 from a wall socket before the temperature sensed has dropped below a preset threshold value. In another embodiment the battery is always used for cool down, and is recharged as needed while the projector is plugged in as described above in connection with the timer-controlled shut-off embodiment. In another embodiment, the temperature sensor is configured to provide a voltage output to control logic 38, which then controls the switching of the power supply 34 and battery 26 to fan 28 and also the recharging of the battery. Control logic 38 can be programmed to accommodate most shut-off scenarios as described above, and keep the battery charged or provide a warning to the operator.

Again, a gradual decrease in power to the lamp to "fade-out" when it is turned off can be provided, and with a temperature sensor the temperature can be monitored and a minimum of cool-down time can be used. Also, control logic 38 can gradually slow the cooling fan based on sensed temperature, or speed it up, so that a desired optimum time vs. temperature cool down function curve can be followed, which can be used to further increase reliability of the projector and prolong bulb life.

In another embodiment the portable power supply 26 can be a disposable battery, rather than a rechargeable one, thereby eliminating the need for charger 36. This may give a lower overall cost in adding this cool-down feature. Since no recharging is provided, however, a warning can be given when a low battery condition is sensed, so that one or more cool-down cycles are possible before the battery is no longer able to perform a full cool-down. This can be done by providing a warning light powered by the power supply. In one embodiment the warning light can be configured to activate after the power plug has been pulled if the battery starts out with sufficient output but is unable to maintain sufficient power output to the fan. The operator can then plug the device back in before the battery fails completely, or at the least will know that the battery should be replaced before the next cool-down cycle.

In another embodiment using a disposable battery, control logic 38 can monitor battery life and give warning via a LDC indicator that the battery should be replaced, for example by showing a battery status as is known in the art based on voltage measured across the battery terminals. In another embodiment, control logic 38 can be configured with a timer and the indicator can periodically warn the user to check the battery for leaks, etc. If the disposable battery is used only as an emergency back-up for not allowing sufficient cool-down before unplugging the projector, and the operator is conscientious, it is conceivable that the battery could fail by leaking before it is depleted so as to require replacement. Since the projector is relatively expensive, protection from battery leaks is a priority.

Further, it is contemplated that the battery may be sufficiently robust enough, such as one used in an uninterruptible power supply (UPS) for use with computer systems and other critical applications, to provide sufficient power not only to operate the fan for cool down, but to operate the entire projector for a limited time. The time limit is greatly dependent upon the power consumption of the projector and the power available from the battery.

As will be appreciated from the forgoing examples the invention can provide a low-cost solution to increasing reliability of a digital/video projector and lowering maintenance costs over the service life of the device and reducing down-time and frustration due to having to replace a burned-out bulb, or replace other componentry due to damage from overheating. While particular exemplary forms of the invention have been illustrated and described, it will also be apparent that various modifications can be made without departing from the spirit and scope of the invention.

What is claimed is:

1. A projector system, comprising:
   a primary power supply;
   an image controller, coupled to the primary power supply, to generate an image signal for display;
   a projection display unit, coupled to the image controller, to receive the image signal and project an image based on the image signal;
   a lamp, coupled to the primary power supply, to illuminate the projection display unit sufficiently enough to cause the projection of the image;
   a cooling fan, coupled to the primary power supply, to cool the lamp after use;
   a portable power supply, coupled to the cooling fan, to power the cooling fan when the primary power supply is disabled prior to the lamp having sufficient time to cool down after use.

2. The projector system according to claim 1 further comprising a battery charger, coupled to the primary power supply and the portable power supply, and wherein the portable power supply comprises a rechargeable battery.

3. The projector system according to claim 1 wherein the portable power supply comprises a disposable battery.

4. The projector system according to claim 1 wherein the portable power supply comprises a solar power cell.

5. The projector system according to claim 1 further comprising control logic, coupled to the portable power supply, the fan, and the power supply, and programmed to monitor selected events and direct action in response to the selected events.

6. The projector system according to claim 5 wherein
   (i) the selected events comprise monitoring the charge state of a rechargeable battery, which serves as the portable power supply, and
   (ii) the action in response is to recharge the rechargeable battery.

7. The projector system according to claim 5 wherein
   (i) the selected event is timing a cool down period, and
   (ii) the action in response is shutting off the fan after a set time has elapsed.

8. The projector system according to claim 5 wherein the control logic includes a temperature sensor, placed proximate the lamp, and wherein the selected events comprise monitoring the lamp's temperature and the action is shutting off the fan after the temperature falls below a cutoff temperature.

9. The projector system according to claim 5 wherein
   (i) the portable power supply comprises a non-rechargeable battery;
   (ii) the selected events comprise monitoring the charge state of the non-rechargeable battery; and
   (iii) the action is signaling the non-rechargeable battery is low.

10. The projector system according to claim 5 wherein
    (i) the portable power supply comprises a battery;
    (ii) the selected events comprise monitoring a charge state of the battery; and
    (iii) the action in response is warning that the charge state is insufficient to perform a complete cool down.

11. A cool-down system configured for projectors having a lamp, comprising:
    a rechargeable battery;
    a power supply;
    a battery recharger, coupled to the rechargeable battery;
    a cooling fan, coupled to the rechargeable battery and the power supply, to cool the lamp during cool down; and
    a control logic system, coupled to the rechargeable battery and the battery recharger, to enable the rechargeable battery to power the cooling fan in the event power is cut off from the power supply and before cool down is completed.

* * * * *